Oct. 8, 1963 G. Z. MULLINS 3,106,009
HELICAL MEMBRANE CUTTER
Filed March 9, 1960 3 Sheets-Sheet 1
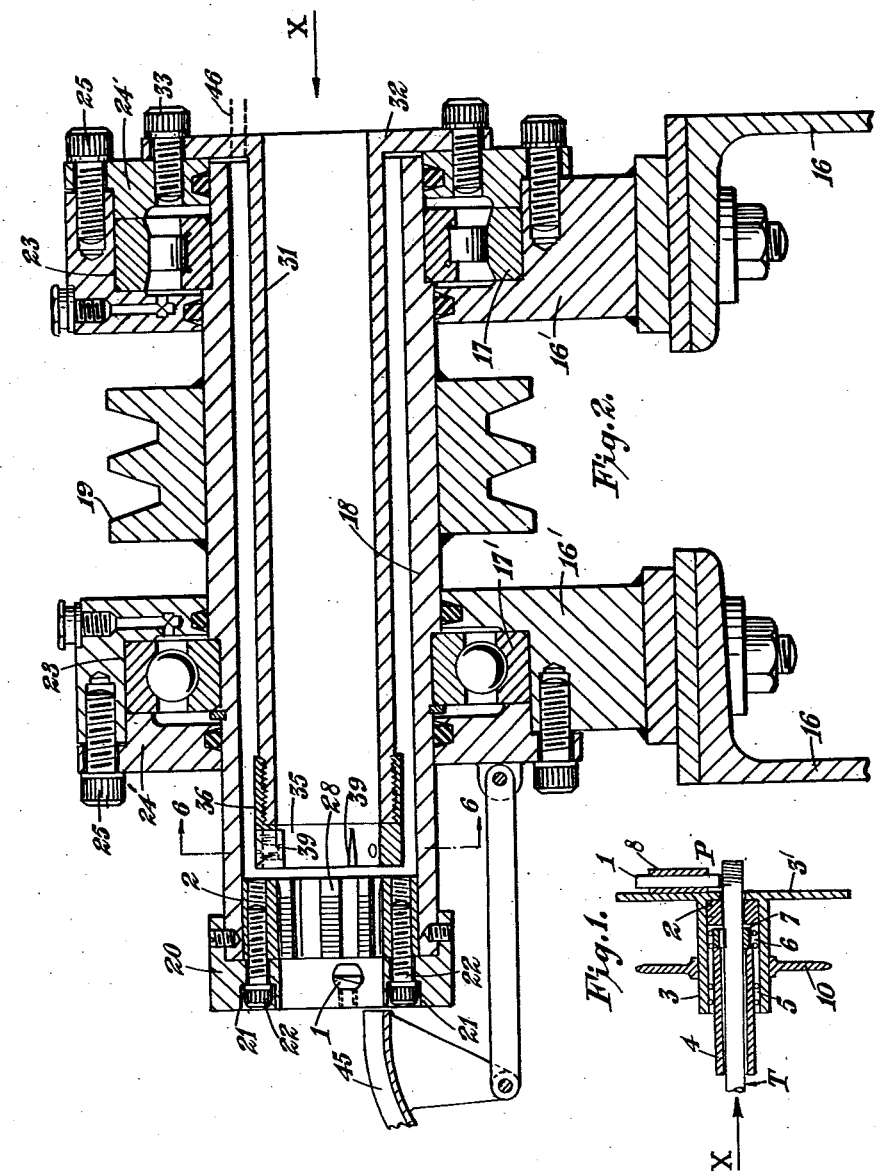
Inventor:
Godfrey Zillwood Mullins
BY Baldwin & Wight
Attorneys

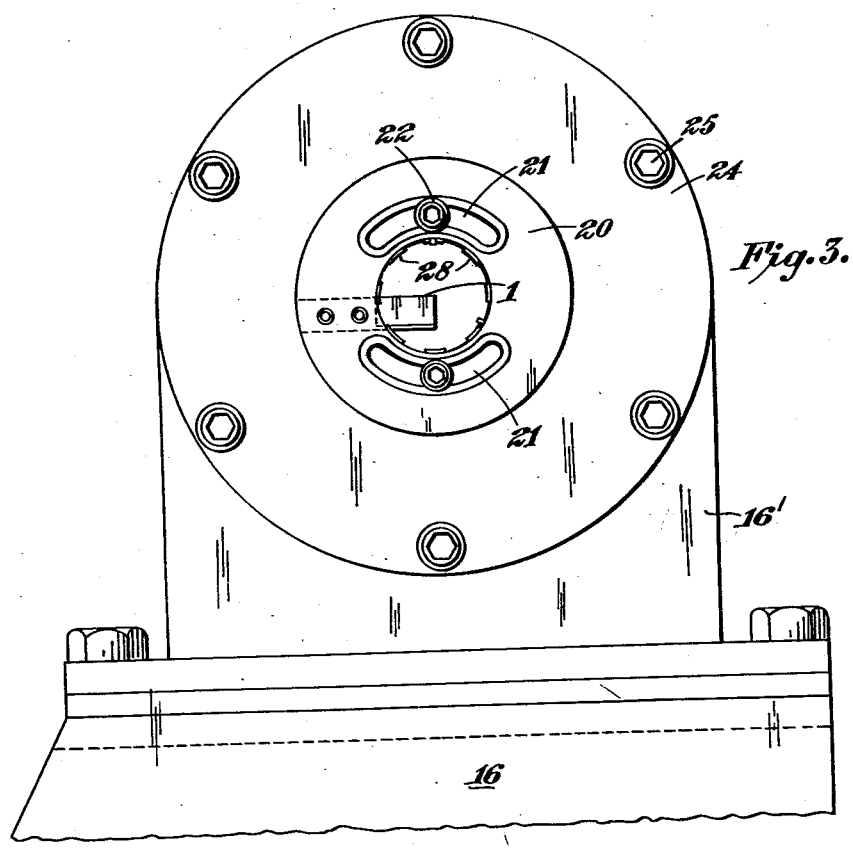

Oct. 8, 1963  G. Z. MULLINS  3,106,009
HELICAL MEMBRANE CUTTER
Filed March 9, 1960  3 Sheets-Sheet 3
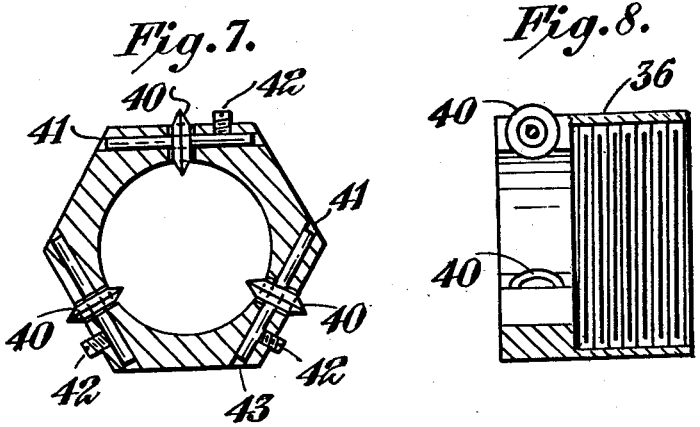
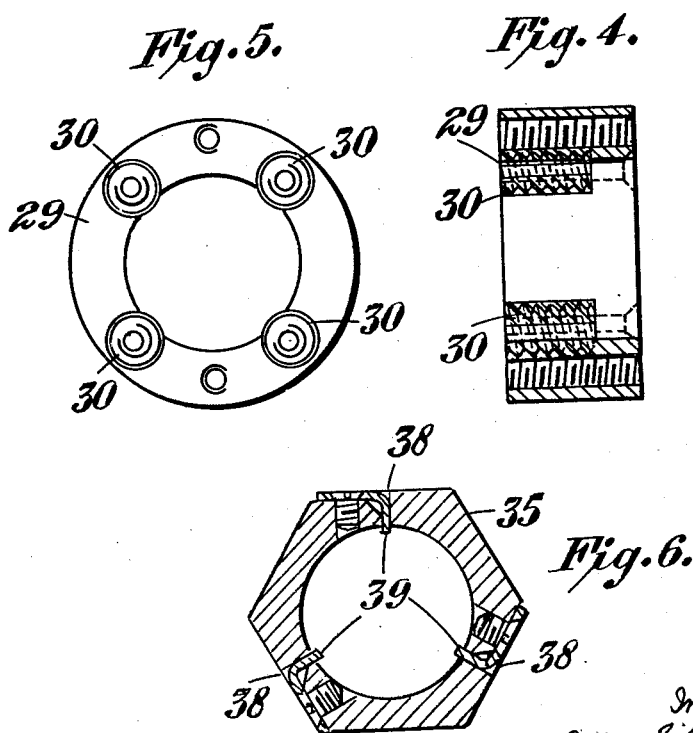

United States Patent Office 3,106,009
Patented Oct. 8, 1963

3,106,009
HELICAL MEMBRANE CUTTER
Godfrey Zillwood Mullins, Lewisham, London, England, assignor to The Telegraph Construction & Maintenance Company Limited, London, England, a British company
Filed Mar. 9, 1960, Ser. No. 13,815
Claims priority, application Great Britain Mar. 9, 1959
7 Claims. (Cl. 29—2.15)

This invention relates to the manufacture of helical membranes for use in the production of electric cables having air spaced insulation.

In United States Patent No. 2,599,857 issued June 10, 1952, there is described a method for the manufacture of a helical membrane for use in the production of air spaced communication cables. According to this method a tube of dielectric material is extruded to accurately determined dimension and is then cut helically to provide a membrane which can be extended on to a conductor to support the latter relatively to an outer conductor coaxial therewith with a substantial air space between the two conductors.

In United States Patent No. 2,823,152 issued February 11, 1958, there is described a method of applying a helical membrane to a conductor or support in such a manner that twisting of the free ends of the helix is overcome. According to this method the conductor or support, about which the helix is wrapped, has a diameter smaller than the internal diameter of the unstretched helix but larger than the internal diameter of the stretched helix. In this way there is applied to the stretched helix a bending moment acting radially to the axis of the helical membrane and this moment, coupled with the friction between the inside surface of the membrane and the conductor, causes it to adhere in a stable condition.

The present invention is concerned with a method of and means for cutting the helical membrane for use in the manufacture of electric cables, particularly communication cables which may be manufactured, for example, by the methods mentioned above.

To minimise the distortion of signals transmitted at high frequencies along helical membrane type communication cables, it is essential that a careful check be maintained upon the dimensional uniformity of the cable during its manufacture. In cutting a tube of dielectric material into a helix, the thickness of the helix depends upon the angular velocity of the cutting tool and the linear velocity at which the dielectric material is fed past the cutter. Relative variations between the angular velocity of the cutting tool and the linear velocity of the dielectric material will produce a variation in the thickness of the cut helix.

By orthodox cutting methods involving the use of a rotating cutting tool which is driven by different gears but from a common source of power with the driving mechanism for urging the dielectric material past the cutting tool, it is possible to insure that the thickness of the helix is constant to a tolerance of one thousandth of an inch. Greater uniformity of the thickness of the helix is impossible due to the imperfections in the driving means. The imperfections are periodic because the machine is composed of rotating parts.

Whilst this tolerance is more than adequate for most communication purposes, for systems involving broad bands of ultra high frequency, even higher standards are desirable because it has been found that this variation in the thickness of the helix is a main factor causing non-uniformity of the cable.

It is the object of the present invention to provide a method and apparatus for manufacturing the helical membrane, which method facilitates the production of a helical membrane of a more uniform thickness.

According to the present invention means for cutting a helix from a tube of insulation material having a predetermined diameter comprises a support or guide tube for the said tube, a tubular carrier rotatably mounted about the guide tube and in which is secured means for advancing the tube to a cutting tool mounted to rotate with the carrier so that on rotation of the latter the tube, which is held against rotation as it is drawn through the guide tube, will be advanced to the cutting tool.

The means for advancing the tube of insulation material, from which the helix is to be cut, may consist of a die element capable of cutting an external thread on the tube, preferably the cutting tool being so co-ordinated that the cut which is imparted by the die element on the external surface of the tube, has substantially the same mean pitch as that which is cut into the tube by the cutting tool.

It is essential that the die or other means for advancing the tube and helical cutting means be as close together as possible in order that the uniformity of thickness of the cut helix is kept at a maximum. In this way, introduction of any non-uniformity of helix through the elasticity of the insulating material is reduced to negligible proportions.

The invention is illustrated in the accompany drawings in which:

FIGURE 1 is a diagrammatic view of a helical cutting machine in accordance with the invention, sectioned through the vertical center line, FIGURE 2 is a sectional elevation of a machine for cutting a helix from a tube in accordance with a preferred embodiment of the invention, FIGURE 3 is an end-on view showing the adjustable support for the knife cutter, FIGURES 4 and 5 are respectively a section and end elevation of a die element fitted with feed rollers in place of die threads, FIGURE 6 is a detail section on the lines 6—6 of FIGURE 2, FIGURES 7 and 8 are respectively transverse and longitudinal sections of an alternative form of knife holder fitted with revolving knives which is used to hold a tube against rotation as it is advanced by the rotating die.

Referring to FIGURE 1, the tube of insulating material is indicated generally at T and is advanced to the cutting point at P through the guide tube 4, which is stationary and on which is rotatably carried a revolving carrier 3. The carrier 3 may be rotatably mounted by means of bearing assemblies 5, 6 and has secured to it a chain wheel 10, through which drive is imparted from e.g. an electric motor (not shown).

The revolving carrier 3 is provided at one end with a flange 3' having a bracket 8, in which is adjustably made fast a cutting tool 1 for cutting the helix in the rod or tube T surrounded by the carrier 3.

Also within and fast to the revolving carrier 3 is a drawing cylinder 2 which may consist of a standard die as commonly used to cut a helical thread. Secured to the end of the guide tube 4 is a series of circumferentially spaced knife elements 7, which bite on to the surface of the tube as it is fed forward by passage through the drawing cylinder 2. It will be appreciated that the action of the knife elements 7 is to hold the tube or rod T against the tendency to rotate about its axis under the action of the threaded surface of the drawing cylinder 2.

In operation the guide or support tube 4 is fitted into a non-rotatable clamp which is so arranged as to allow a tube of insulating material, for example, polythene, to be fed through the bore of the support tube 4. The cutter 1 having been adjusted radially to suit the dimensions of the tube of insulating material, is then set at the correct cutting angle to suit the helix to be cut. On rotation of the carrier 3 by means of the chain wheel drive 10, the tube of insulating material will be advanced through the bore of the support tube 4, since the drawing cylinder 2, which rotates with the carrier 3 will, due to its frictional engagement with the tube T of insulating material, draw it in an axial direction as indicated by the arrow X in FIGURE 1 through the bore of the support tube 4. It will be appreciated that the helical thread cutting surfaces which are in the drawing cylinder 2 will indent or cut into the surface of the tube T, and since the latter is held against rotation by the knife element 7, it will be forced to move axially along the tube toward the cutter 1. The assembly of knives 7, which is stationary, puts three slight longitudinal cuts in the outer surfaces of the tube T of insulating material and thus holds it against rotation. The tool 1, being rotated in contact with the tube T in a plane normal to the tube axis, cuts the membrane on a pitch corresponding to that of the helical thread cutting surfaces.

It will be appreciated that the cutting surfaces on the die element are so chosen that the threads correspond to the required pitch of the helix to be cut from the tube.

The same die element or drawing cylinder 2, which is used with the apparatus of FIGURE 1 is used with that of FIGURE 2 and in the latter, the cylinder is shown in enlarged detail. Referring now to FIGURES 2 and 3 there is shown a helical membrane cutting machine comprising a base 16 having brackets 16' for bearing assemblies 17, 17', in which is rotatably mounted a tubular shaft 18 having secured thereon a driving pulley 19. Each of the brackets 16' is formed with an annular recess 23 to receive its bearing assembly. The bearing assemblies 17, 17', together with the shaft 18, are held in position by means of cover plates 24, 24' and set screws 25.

Secured to one end of the shaft 18 is an annular cutter holder 20 on which the cutter knife 1 is mounted. The holder 20 is capable of angular adjustment in relation to the shaft, as hereinafter described. For this purpose the holder 20 is provided with arcuate slots 21 to receive the heads of fixing screws 22 by means of which the cutter holder 20 is fixed to the drawing cylinder 2 in the end of the shaft 18. The drawing cylinder, as stated above, may consist of a die having a number of segmental threads 28 which may or may not cut the surface of the tube. It will be understood that where the die surfaces merely press into the tube it is not always essential to permanently deform the latter.

Alternatively the cutting threads may be such as to provide an initial cut in the tube. By providing a number of cutters with which the cut helix progressively deepens into the tube, the final cutting tool may be only required to give a finishing cut.

The cutting tool 1 and the means for advancing the insulating tube impart a torque to it and so it is desirable that the insulating tube be held against rotation by one or more knives, rollers or wheels which cut or deform the outer surface of the insulating tube to provide one or more longitudinal cuts or grooves.

As shown in FIGURES 4 and 5, such an alternate means for advancing the insulating tube comprises a die ring 29 which is provided with a series, conveniently four, of rollers 30, the surfaces of these rollers being formed with a thread of the required pitch to advance the tube or rod to be cut to the cutting head.

A guide tube 31 is provided inside the bore of shaft 18, this tube 31 being provided with a flange 32 at its entrant end by means of which it is secured by set studs 33 to one of the cover plates 24. The other end of the tube 31 has secured thereto a knife holder 34 (see FIGURE 6), the knife holder being formed with a socket 36 to fit over the end of the guide tube 31 and being formed with radial apertures 38 in which are secured knife blades 39, these blades being adapted to bite on to the tube or rod to be cut.

In the alternative construction shown in FIGURES 7 and 8 in place of the fixed knives 38, rotary knives consisting of cutter wheels 40 mounted to revolve on spindles 41, may be used, the spindles 41 being secured by means of set screws 42 in bores 43 in the holder. The knife wheels 40 rotate in respective planes containing the axis of the tubular guide 31.

Guiding means may be provided for guiding the cut helix away from the cutter. The guiding means may comprise a curved chute 45 which is semi-circular in cross section to provide side walls which retain the cut helix. The curve of the chute is horizontal at the point where it receives the cut helix which slides down the chute into say a container. The chute prevents portions of the helix from becoming entangled and also prevents the knife from damaging the cut helix.

In some instances it may be found that when the means for advancing the insulating tube consists of a die there is a tendency for the die to crumble the portion of the insulation that is removed by it from the insulating tube. This crumbled insulation may collect in the flutes of the die and fuse through the heat generated by the die. This may be prevented by passing a suitable cooling medium along the flutes of the die so that the crumbled insulation is removed at the same time that the die and insulating tube are cooled. It has been found that if air is drawn off from the flutes of the die at the point of entry of the tube of insulating material, the crumbled insulation is removed and the die is kept at a reasonable temperature. The air may be drawn off through a pipe connection 46 by a vacuum cleaner which collects the crumbled insulation.

In some instances, particularly when long lengths of insulating tube are being cut into a helix, the insulating tube may become twisted between the supply reel and the means for preventing the rotation of the insulating tube. This may be prevented by mounting the supply reel in such a manner that it can freely rotate about the axis along which the twist is incurred in the insulating tube.

The external diameter of the insulating tube may be shaved by passage through rotating knives or through a heated die before it is fed to the means for cutting it into a helix to produce an insulating tube and cut helix of uniform outside diameter. This facilitates the cutting of the helix by preventing to some extent the crumbling of the insulating material and fusion of the crumbs in the flutes of the die when a die is used.

What is claimed is:

1. In apparatus for cutting a membrane in the form of a helix from a tube of plastic material, the combination of a guide for the tube to be cut; a carrier mounted for rotation about an axis concentric with that of a tube guided by said guide; a cutting head comprising a cutter associated with the carrier for rotation therewith, said cutter projecting transversely of said axis to cut an incision completely through the wall of the tube, said carrier having helically formed indenting surfaces other than said cutter and spaced from said cutter longitudinally of said axis and located between said cutter and said guide, said indenting surfaces being engageable with the uncut surfaces of the tube for advancing the tube to the cutting head; means for holding the tube against rotation; and means for rotating the carrier, whereby the tube will be advanced to the cutting head at a rate coordinated with the pitch of the helix.

2. In apparatus for cutting a helical membrane from a tube of plastic material, a guide for a tube to be cut; a carrier surrounding a tube guided by said guide and being journalled to rotate about the axis of the tube; means for preventing rotation of the tube; a cutting tool fast with said carrier for rotation therewith, said cutting tool projecting transversely of said axis to cut an incision completely through the wall of the tube; helical indenting surfaces fast with said carrier and being spaced from said cutting tool longitudinally of said axis and located between said cutting tool and said guide, said indenting surfaces being engageable with the tube for moving the tube axially toward the plane of rotation of said cutting tool when said carrier is rotated; and means for rotating said carrier, and with it, said cutting tool and said helical indenting surfaces in unison.

3. Apparatus as claimed in claim 2 in which the carrier is in the form of a tube, the cutting tool is secured to one end of the tubular carrier, and the helical indenting surfaces are fixed in that end of the tubular carrier adjacent the cutting tool.

4. Apparatus as claimed in claim 2 including a helically threaded die element mounted in the carrier and providing said helical indenting surfaces.

5. Apparatus as claimed in claim 2 in which the means for preventing rotation of the tube comprises a knife secured to said guide at the end thereof adjacent said helical indenting surfaces.

6. Apparatus as claimed in claim 2 in which said guide is tubular and in which said means for preventing rotation of the tube to be cut comprises a knife holder secured to the tubular guide, and a plurality of knives mounted on said knife holder and being circumferentially spaced with respect to said tubular guide.

7. Apparatus as set forth in claim 6 in which said knives are of wheel form and are mounted on said knife holder to rotate in respective planes containing the axis of said tubular guide.

References Cited in the file of this patent

UNITED STATES PATENTS

| 765,327 | Stillman | July 19, 1904 |
| 2,313,986 | Brown | Mar. 16, 1943 |
| 2,323,700 | Bailey | July 6, 1943 |

FOREIGN PATENTS

| 369,554 | Italy | Mar. 22, 1939 |